United States Patent [19]

Leigers

[11] 4,443,999
[45] Apr. 24, 1984

[54] CHOPPING CUTTER OF A SUGAR CANE HARVESTER

[75] Inventor: Günter Leigers, Harsewinkel, Fed. Rep. of Germany

[73] Assignee: Claas OHG, Harsewinkel, Fed. Rep. of Germany

[21] Appl. No.: 374,599

[22] Filed: Apr. 30, 1982

[30] Foreign Application Priority Data

May 9, 1981 [DE] Fed. Rep. of Germany ... 8113762[U]

[51] Int. Cl.³ ..................... A01D 45/10; A01D 49/00; B27G 13/04
[52] U.S. Cl. ..................................... 56/13.9; 144/229
[58] Field of Search .................. 56/13.9; 144/229, 230

[56] References Cited

U.S. PATENT DOCUMENTS

| | | | |
|---|---|---|---|
| 872,414 | 12/1907 | Hall | 144/230 |
| 2,239,615 | 4/1941 | Melde | 144/230 |
| 2,731,991 | 1/1956 | Cowley | 144/229 |
| 3,039,503 | 6/1962 | Mainone | 144/230 |
| 3,214,106 | 10/1965 | Gorman | 144/230 |
| 4,009,742 | 3/1977 | Ziegelmeyer | 144/230 |
| 4,035,996 | 7/1977 | Fernandez et al. | 56/13.9 |
| 4,065,912 | 1/1978 | Quick | 56/13.9 |
| 4,131,047 | 12/1978 | Schriber et al. | 144/230 |
| 4,257,462 | 3/1981 | Oller | 144/230 |

Primary Examiner—Paul J. Hirsch
Attorney, Agent, or Firm—Michael J. Striker

[57] ABSTRACT

A cutting device of a sugar cane harvester, which includes a pair of rotary rollers each provided with elongated cutting straps having a number of blades and extended parallel to the axes of the respective rollers. Each roller is formed with an elongated supporting strip and a number of supporting projections spaced from the strip so as to form a plurality of grooves each receiving individual blades of the cutting strap and a clamping member. The blade and the clamping member are clamped between the side walls of the groove by a bolt extending through the clamping member into the body of the roller.

5 Claims, 3 Drawing Figures

CHOPPING CUTTER OF A SUGAR CANE HARVESTER

BACKGROUND OF THE INVENTION

The present invention relates to a sugar cane harvester in general, and more particularly to a chopping cutter for cutting cane sticks.

Known sugar cane harvesters are usually equipped with a cutting device which cuts cane sticks received from a cane stick feeding device of the sugar cane harvester. Such a sugar cane harvester is disclosed, for example, in the U.S. Pat. No. 4,065,912. In the known harvester two overlapped cutting rollers provided with blades are arranged for rotation to cut cane sticks received therebetween. Each roller is formed with two oppositely positioned limiting stops, and the blades are pressed against those stops via a clamping strip. Both stops and the asigned clamping strip are formed with through bores extended transversally to the axis of elongation of the blades and arranged to receive the respective bolts to connect the blades to the roller. The disadvantage of this otherwise satisfactory mounting arrangement is that the through bores formed in the clamping strips and the limiting stops of the roller and extending in the transversal direction substantially weaken the whole clamping arrangement, and in order to strengthen the arrangement it is necessary to considerably enlarge its dimensions, which is, of course, not desired.

SUMMARY OF THE INVENTION

It is an object of the invention to provide an improved cutting device for a sugar cane harvester.

Another object of the invention is to provide an improved sugar cane cutting device which can be mounted on conventional harvesters.

Still another object of the invention is to provide a stick chopping cutter with a rigid and reliable blade mounting arrangement.

These and other objects of the invention are attained by a cutting device for a sugar cane harvester, comprising a pair of cutting rollers rotatably mounted on the harvester for rotation about parallel axes and each provided with at least one cutting strap including a plurality of blades and positioned to superimpose and cooperate with the cutting strap of another roller to cut sticks passing therebetween upon rotation of said rollers, and means for clamping said cutting strap on the respective roller. The clamping means include an elongated supporting strip provided on the respective roller and extended in an axial direction of said roller, a plurality of supporting projections provided on the respective roller and spaced from said supporting strip so as to form a plurality of grooves extended in the axial direction of the roller and adapted to receive the blades of the cutting strap, one side wall of each groove being formed by the supporting strip and an opposite side wall of each groove being formed by a respective supporting projection, the supporting strip defining a first bearing surface for the respective blade received in the groove, a plurality of clamping elements each slidably inserted into the respective groove together with the respective blade, each clamping element defining a second bearing surface for the respective blade received in said groove, and a plurality of releasable bolts extending through the respective clamping elements into the respective grooves and received in the respective rollers. The bolts clamp the respective blades in the respective grooves so that each blade is pressed between said first bearing surface and said second bearing surface.

In accordance with the further features of the invention each groove converges towards its bottom so that each blade, after the clamping element has been inserted into the groove, is immovably clamped in the groove.

In order to accurately orient and fix each blade in its proper position, each groove is formed with a step in the region of said one wall thereof, the blades each having a cutting edge and a rear end opposite to its cutting edge, said rear end resting against said step of the groove.

It is further advantageous to adjust the cross-section of the clamping element in dependence upon the thickness of the cutting strap inserted in the groove.

In accordance with further distinctive features of the invention each roller is provided with a plurality of threaded holes receiving the respective bolts clamping said clamping elements in said grooves. Due to such mounting arrangement, in the case of the required repair, any blade can be easily removed from the groove and substituted by another blade.

The supporting projections may be spaced from each other in the axial direction of the roller so that the grooves at ones sides thereof are interrupted. Such a structure enables one to easily remove an individual blade from the groove by means of, for example, a lever. Still further advantage of the invention is that the interrupted grooves are easily accessible for cleaning.

The supporting strip as well as the supporting projections may be integral with the body of the roller, which may be attained in a simple conventional manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
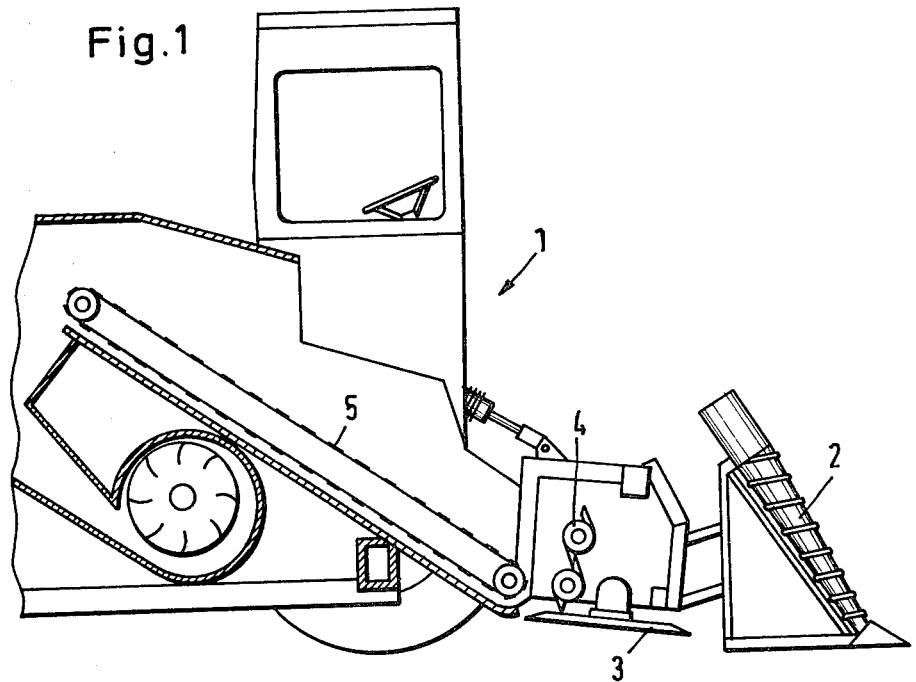
FIG. 1 is a side partial view of a sugar cane harvester with a cane cutting device according to the invention.
Figure 2:
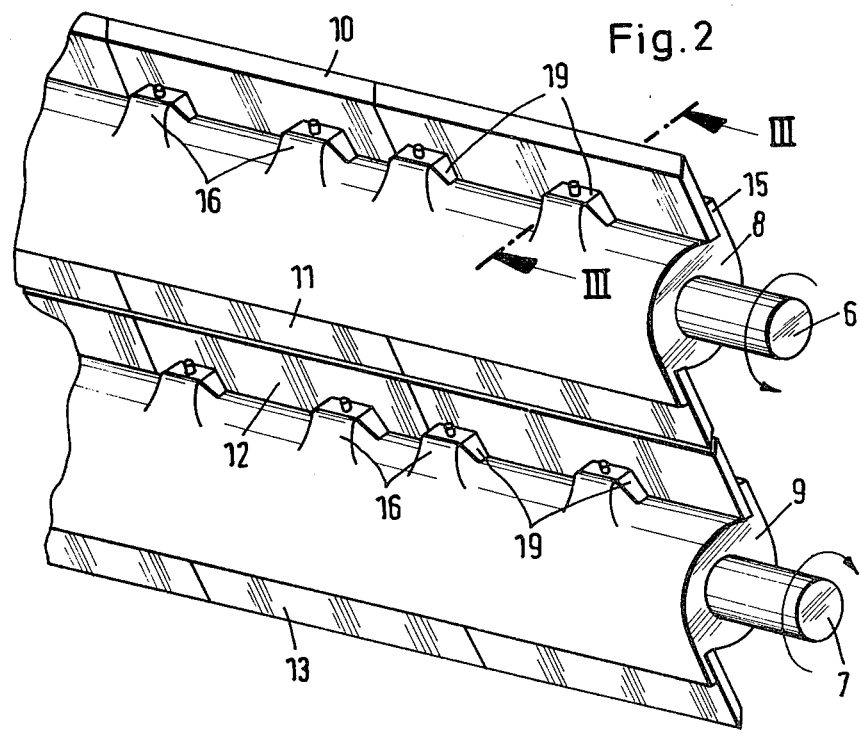
FIG. 2 is a partial perspective view of the cane cutting device.

Referring now to the drawings, a self-propelled sugar cane harvester generally denoted as 1 includes a sugar cane feeding device 2, rotary blade like discs 3 and a chopping cutter 4 from which cut cane sticks are fed into a sloped ascending conveyor 5 which in turn conveys the cane sticks to a sugar cane purification stage known in the sugar cane harvesters of the type under discussion but not illustrated herein. The cane cutting device or chopping cutter 4 shown in detail in FIG. 2 includes two superimposed cutting rollers 8 and 9 each of which is mounted on a respective axle 6 and 7. Axles 6 and 7 are parallel to each other and in operation are rotated by a drive of the sugar cane harvester, which is also know and not shown in the drawing. Each roller carries two cutting straps 10, 11 and 12, 13 each of which includes a plurality of blades adjacent to each other. The blades of one roller 8 cooperate with the blades of the second roller 9 so as to cut sticks passing between rollers 8 and 9 as the latter rotate.

Figure 3:
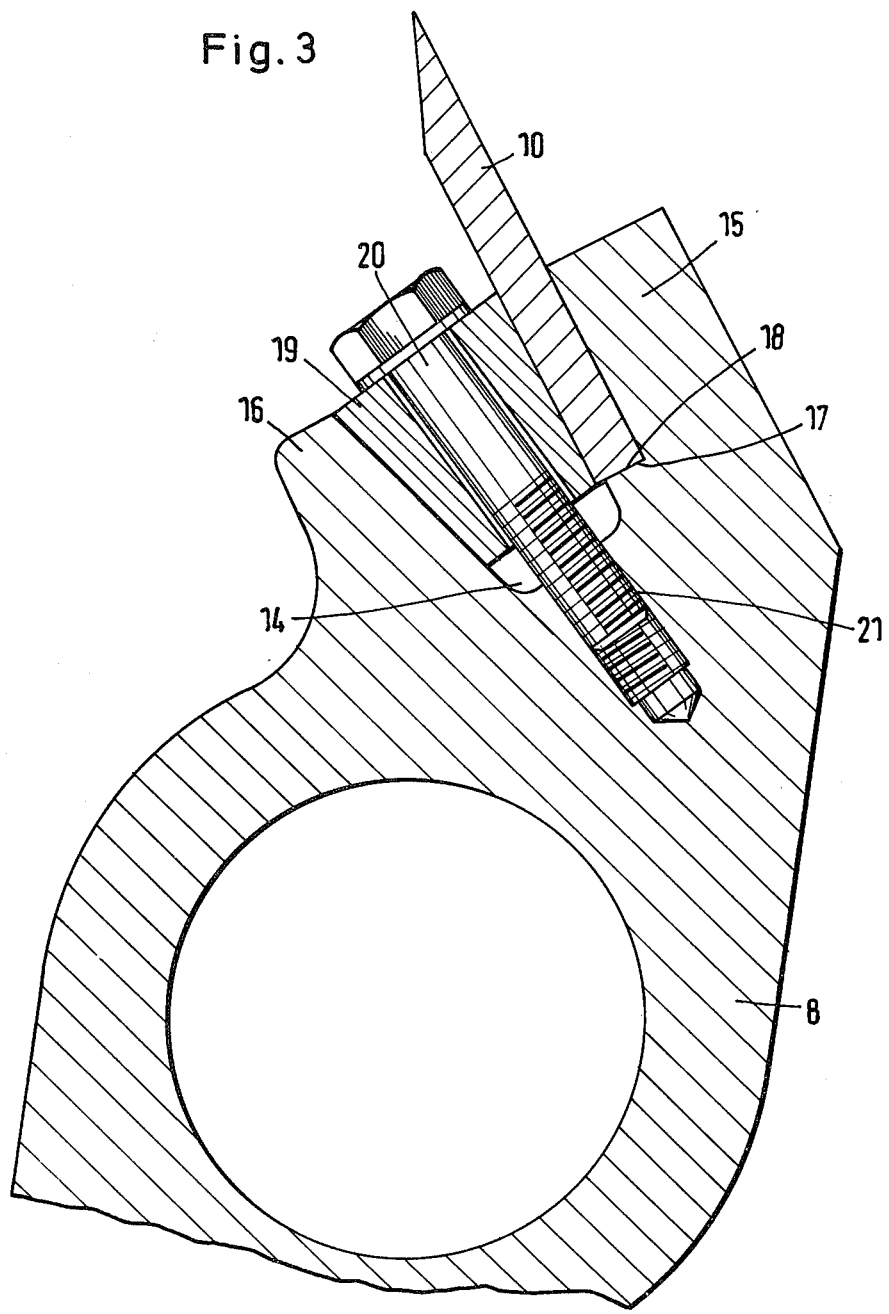
FIG. 3 is a partial sectional view along line III—III of FIG. 2.

In order to hold the blades of the cutting straps on the respective rollers each roller is formed with grooves 14. Roller 8 is illustrated in FIG. 3. Grooves 14 are formed by a longitudinal strip 15 integral with the respective roller (roller 8 in FIG. 3) and extending parallel to the axis of the roller and by a number of supporting projections 16 spaced from each other in the axial direction and spaced from strip 15 in a direction transversal to the axis of the roller. Each nut 14 is so formed that it converges to its bottom. Each nut is also formed with a step 17 on the side of strip 15 so as to receive the respective cutting strap 10—13 which is inserted into nut 14 to rest on step 17 by its rear end 18 whereby the position of the cutting strap along its height is determined. Clamping elements 19 are then slidably inserted into the respective grooves 14. Each roller is formed with threaded holes 21 and each clamping element is made with on associated hole so that after the clamping element 19 is mounted in groove 14 a bolt 20 is threadedly inserted into hole 21 to clamp element 19 and the respective blade of cutting strap 10 in its inserted position. Due to the fact that each nut 14 is narrowed towards its bottom the cutting strap (strap 10 in the drawing) will be immovably clamped between the clamping element 19 and the supporting strip 15.

If one wishes to change the individual blade or strap one simply releases individual bolts 20 and takes the strap out of the clamping arrangement. It is advantageous that grooves 14 are formed interruptedly at one sides thereof because after the cutting strap has been removed from the grooves the latter can be easily cleaned.

It will be understood that each of the elements described above, or two or more together, may also find a useful application in other types of sugar cane cutting devices differing from the types described above.

While the invention has been illustrated and described as embodied in a sugar cane cutting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cutting device for a sugar cane harvester, comprising a pair of cutting rollers rotatably mounted on the harvester for rotation about parallel axes and each provided with at least one elongated cutting strap including a plurality of blades positioned in said strap side by side to each other, said strap cooperating with the cutting strap of another roller to cut sticks passing therebetween upon rotation of said rollers; and means for clamping said cutting strap on the respective roller, each said roller being formed with an elongated supporting strip extended in an axial direction of said roller and a plurality of supporting projections spaced from each other in said axial direction, said projections being spaced from said supporting strip so as to form a plurality of grooves extended in said axial direction and spaced from each other in said axial direction and adapted to receive respective blades of said cutting strap, one side wall of each groove being formed by said supporting strip and an opposite side wall of each groove being formed by a respective supporting projection, said supporting strip defining a first bearing surface for the respective blade received in said groove, said clamping means including a plurality of clamping elements each slidably inserted into the respective groove together with the respective blade, each clamping element defining a second bearing surface for the respective blade received in said groove, and a plurality of releasable bolts extending through the respective clamping elements into the respective grooves and received in said rollers, said bolts clamping the respective blades in the respective grooves so that each blade is pressed between said first bearing surface and said second bearing surface.

2. The cutting device as defined in claim 1, each said groove having a bottom, said groove narrowing towards said bottom.

3. The cutting device as defined in claim 2, wherein said groove is formed with a step in the region of said one wall thereof, said blades each having a cutting edge and a rear end opposite to its cutting edge, said rear end resting against said step of said groove.

4. The cutting device as defined in claim 3, wherein the thickness of the clamping element is adjusted in dependence upon the thickness of the cutting strap inserted in the groove.

5. The cutting device as defined in claim 4, wherein each roller is provided with a plurality of threaded holes receiving the respective bolts clamping said clamping elements in said grooves.

* * * * *